United States Patent [19]

Petersen

[11] Patent Number: 4,745,345
[45] Date of Patent: May 17, 1988

[54] D.C. MOTOR WITH AXIALLY DISPOSED WORKING FLUX GAP

[75] Inventor: Christian C. Petersen, Pocasset, Mass.

[73] Assignee: Camatec Corporation, Fremont, Calif.

[21] Appl. No.: 936,815

[22] Filed: Dec. 2, 1986

[51] Int. Cl.[4] ............................................. H02K 29/08
[52] U.S. Cl. .................................. 318/254; 318/138; 310/68 R
[58] Field of Search ............ 310/268, 216, 156, 68 R; 318/138, 254, 439

[56] References Cited

U.S. PATENT DOCUMENTS

| | | | |
|---|---|---|---|
| B 352,950 | 1/1975 | Warren et al. | 318/254 X |
| 3,124,733 | 3/1964 | Andrews | 318/254 X |
| 4,206,379 | 6/1980 | Onda | 310/156 |
| 4,283,664 | 8/1981 | Ebert | 318/254 X |
| 4,288,709 | 9/1981 | Matthias et al. | 310/268 X |
| 4,629,921 | 12/1986 | Gavaletz | 310/156 |

Primary Examiner—Bentsu Ro
Attorney, Agent, or Firm—Mueller and Smith

[57] ABSTRACT

A p.m. d.c. motor in which a stator is structured as a magnetically permeable base upon which stator pole components are mounted in upstanding fashion. Each of the stator pole components is formed as a laminar core of elongate rectangular shape about which a plastic bobbin is slideably positioned. The field windings of the stator are wound about this bobbin to provide a structure having no flared tips or the like and wherein winding can take place on bobbins separately from the stator structure. A disk-shaped rotor carrying a sequence of flat permanent magnets is positioned over the tips of the stator components and is rotatably driven by select energization of the latter. Select skewing of the stator poles and design of the geometry of the permanent magnets functions to significantly reduce detent torque phenomena.

26 Claims, 5 Drawing Sheets

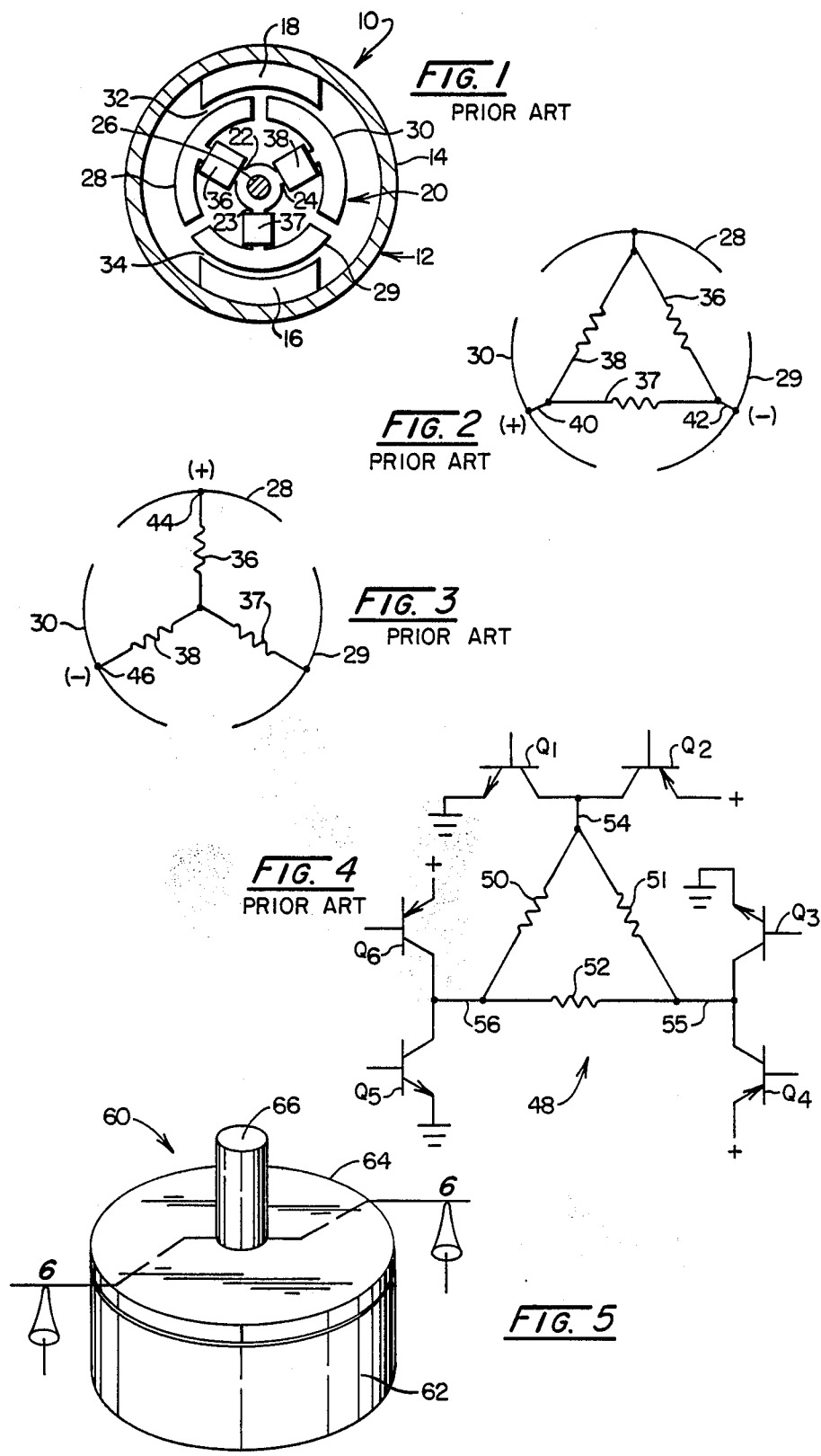

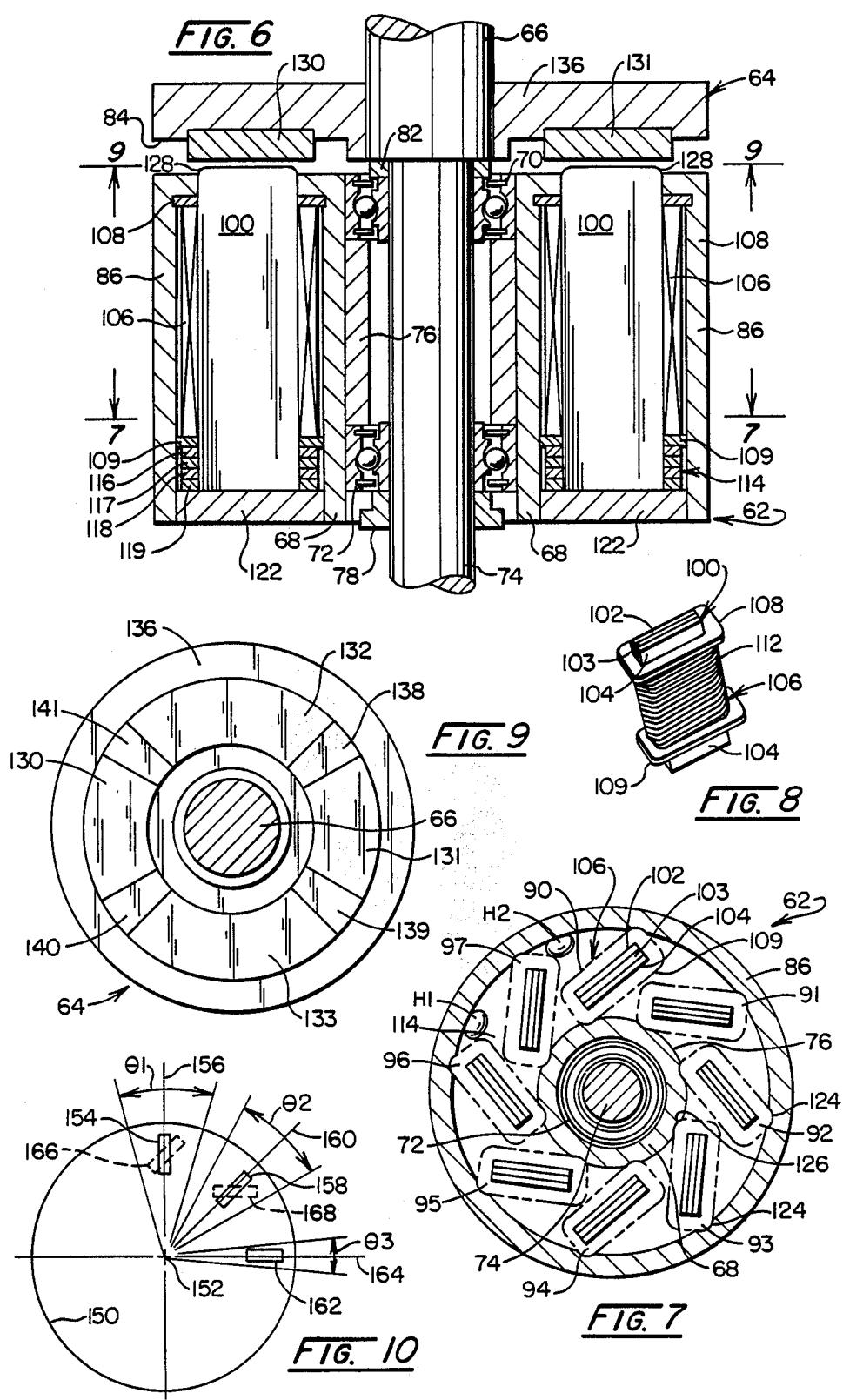

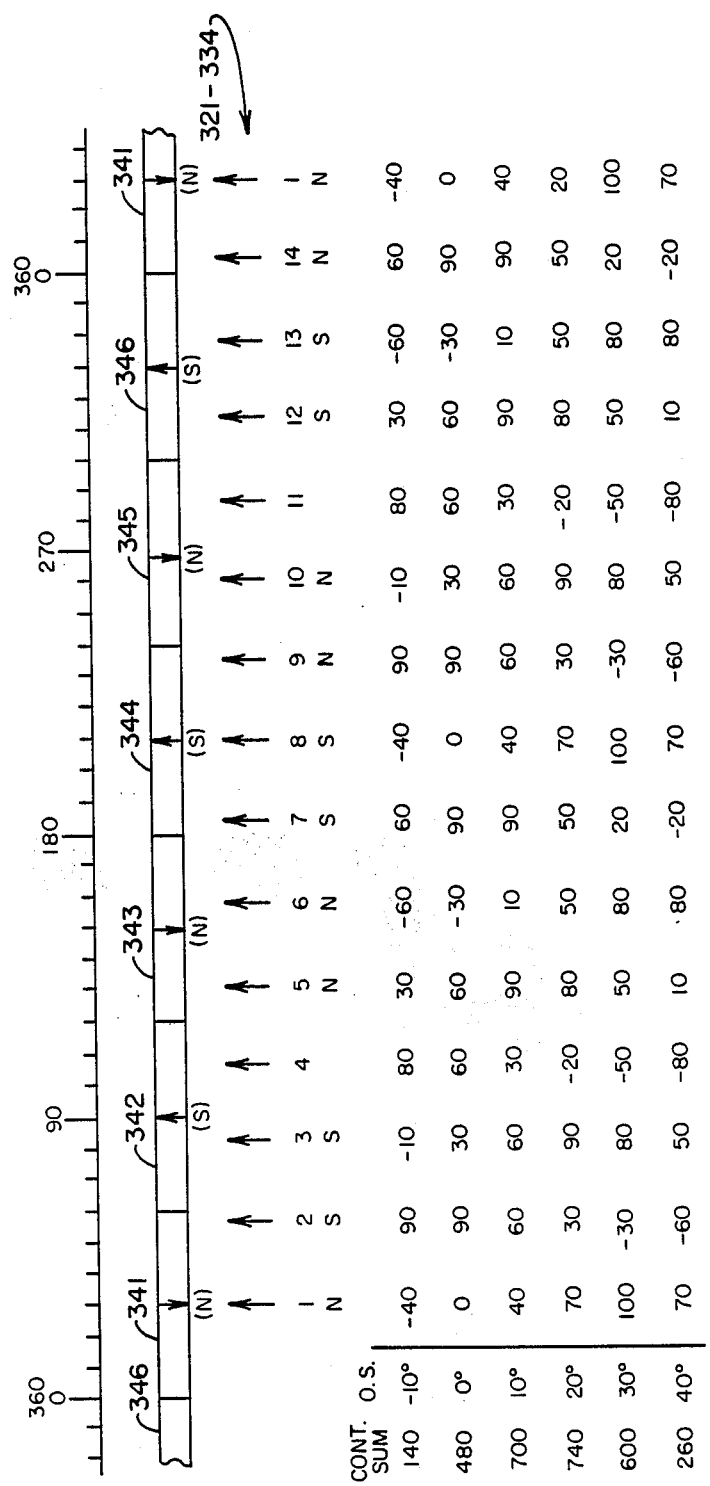

D.C. MOTOR WITH AXIALLY DISPOSED WORKING FLUX GAP

BACKGROUND

Investigators involved in modern electronic and electro-mechanical industries increasingly have sought more refined and efficient devices and techniques in the generation of motion and the effectuation of its control. For example, the mass storage of data for computer installations is carried out by recordation on magnetic disks which are rotatably driven under exacting specifications. The speed of data handling performance of these computation systems is very much dependent upon the available speed of recording and retrieval from the surfaces of the disks. Similar requirements of performance are to be observed in the fields of robotics, machine tools and the like.

In the past, pneumatic and hydraulic movers were resorted to for a great many of the latter applications. However, a significant trend to electrically powered devices has occurred because of their inherently faster and more reliable motion control. Such control capability has greatly expanded with the emergence of the microprocessor on a significant scale.

Permanent magnet (P.M.) direct current (d.c.) motors represent the largest and most cost effective portion of the current electrical motor market. These motors occur in a wide variety of designs.

Generally, the classic P.M. d.c. motor is a three-phase device having a stator functioning to mount two or more permanent magnet poles which perform in conjunction with three of more rotor mounted field windings which are wound over the inward portions of pole structures typically formed of laminated steel sheets. The ends or tip portions of the rotor poles are flared or curved somewhat broadly to improve their magnetic interaction with the stator magnets. Typically, field windings are intercoupled in either a delta or Y circuit configuration and by exciting them in a particular sequence, an electromagnetic field, in effect, is caused to move from one flared pole tip to the next to achieve an interaction with the permanent magnets and evolve rotational motion. This interaction occurs in almost all designs through an air gap which is disposed "radially" to the motor shaft between the stator and rotor in parallel relationship with the axis of the rotor, i.e. a "radial gap" is provided. The interaction between the permanent magnet field and the field of the excited windings is one wherein force vectors are developed in consequence of an association of the exciting field with the field or flux sense of the magnets. Where typical ferrite or alnico type permanent magnets are used, any other disposition of the field interaction would effect a destructive demagnetization of these magnets. Classically, the switching providing select excitation of the field windings is provided by a commutator rotating with the rotor and associated with brushes representing a make and break mechanical switching device functioning to move the field along the pole tips.

As the classic P.M. d.c. motor has been applied to more sophisticated electromechanical systems, it has been found to be dificient in many aspects. For example, the make and break commutation is electrically noisy, a condition which in many applications will be found to be unacceptable. The motors are heavy and are large and these aspects contribute to undesired design requirements for bulk where the designer loses much of the flexibility of innovation which is desired. While the motors have been produced in great quantities, their production is hindered by the nature of the pole structure carrying their field windings. Because of the flared ending or curved tips of the individual poles carrying the windings, the procedure for effecting winding is one somewhat complex and must be carried out underneath the flared tips on a fully assembled rotor. This requirement has impeded design progress which otherwise would be realized with motor structures which are simply changed to alter performance characteristics.

To address the performance limitation of electrical noise caused by the brush type motors, brushless P.M. d.c. motors have been developed wherein field commutation otherwise carried out mechanically has been replaced with an electronic circuit. These motors generally provide a higher quality performance including a much quieter electrical performance. However, this quiet electrical system, wherein the magnetic components move as opposed to the field windings, to date, has been implemented in relatively larger sizes than otherwise desired. Further, the windings, as in earlier motors, are provided beneath flared pole tips on the inside of the stator surface and thus are even more difficult to assemble and are not amenable to simple alteration for customized manufacture and the like.

Another characteristic of typical d.c. motors having poles configured as steel cores with associated field windings resides in a somewhat inherent development of detent torques. At rest, or in a static state, the steel poles of a typical rotor will assume an orientation with respect to associated permanent magnets which develops flux paths of highest density and least reluctance. Thus, were one to hand rotate the rotor of an unenergized motor, these positions of rest or detent positions can be felt or tactily detected as well as the magnetic field induced retardation and acceleration developed in the vicinity of the detent positions. During an ensuing excitation state of the motor windings, this detnet torque will be additively and subtractively superimposed upon the operational characteristic of the motor output to develop instantaneous speed variations (ISV) which are generally uncorrectable, for example, by electronics. ISV characteristics also can be generated from mechanical unbalance phenomena in the rotor of a motor itself or the bearings thereof if they are a part of the rotating mass. Additionally, the effects of the above-described detent torque contribution to ISV can be somewhat amplified where the characteristics tend to distort the otherwise idealized torque characteristic curve which normally will exhibit a form of ripple often accommodated for by the addition of more phases to the architecture. Where these characteristics of distortion occur, the result can be quite pronounced at lower motor speeds. In the past, the output of the motors has been smoothed through resort to rotational masses such as flywheels and the like, however, for great numbers of modern applications, motors exhibiting large ISV characteristics are unacceptable. For this reason, spindle motors for floppy disk drives have been configured as vector cross products or B cross I devices, sometimes known as voice coil motors, which do not employ steel pole structures. Another approach which has been employed has been to alter the axially aligned gap of the motors to a twisted orientation by developing a step form of association of the sheets of steel forming the laminated steel pole cores. Of course, this leads to further complexity in the design of the motors and in the manufacture of them with internally manufactured field windings.

SUMMARY

The present invention is addressed to motion generating apparatus such as a d.c. motor of a brushless variety employing a rotor-stator pole architecture wherein the working flux gas is disposed axially (perpendicularly to the motor axis). This architecture further employs the use of field windings which are very simply structured, being supported from stator pole core members which, in turn, are mounted upon a magnetically permeable base. The core members preferably are formed as steel laminates of simple elongate rectangular shape which are nestable within the internal channels of simple, insulative bobbins about which the field windings are wound.

A driven component or rotor is configured to mount permanent magnets which are movable with the rotor along a locus of motion defined by the stator component end regions. By selectively exciting the field windings, torque is developed in the rotor in consequence of a unique magnetic path wherein flux is directed perpendicularly to the surfaces of the permanent magnets carried by the rotor. As a consequence of the simple stator pole structure wherein the field windings may be wound about simple bobbins and then slideably placed over the core laminates, very significant manufacturing savings are avhieved. In addition to this significant simplification for manufacture, the structures involved permit the designer a significant latitude in design. For example, the windings readily may be altered to suit specific needs and the placement and number of stator poles may be varied quite readily. Through a unique skewed orientation of the stator poles, the deleterious effects of detent torques are significantly alleviated to an extent permitting the motors to be employed, for example, in conjunction with computer disk drives and the like. Further improvement over detent torque characteristic phenomena is achieved by the structuring of the permanent magnets employed with the rotor. For example, this structuring may be provided such that a form of detent torque cancellation is achieved.

A feature of the invention is to provide motion generating apparatus wherein a magnetically permeable base is provided. Upon this base, a predetermined number of magnetically permeable core components are mounted in an upstanding fashion connected in magnetic flux transfer communication with the base and extending along their lengthwise extents to end locations arranged to define a locus of selectively spaced pole positions, the core components are insertably positioned within insulative devices which provide insulation along the lengthwise extent thereof. The field windings then are supported upon the insulative arrangement and are selectively excitable during an excitation state of the apparatus. A driven component such as a rotor is provided which includes a magnetically permeable disk shaped support, a select number of thin permanent magnet segments formed of magnetic material substantially resistant to demagnetization in the presence of flux directed thereinto, fixed to the noted support and movable therewith along the locus to provide flat, outwardly disposed surfaces extending over the pole positions and substantially perpendicular to the lengthwise extents thereof, these magnetic surfaces being spaced a predetermined gap width from the end locations and being configured having a dimension along the locus selected to effect a substantial minimization of static state attraction and repulsion characteristics between the driven component and the pole positions when the driven component is driven during an excitation state by select excitation of the field windings.

Another feature of the invention is to provide a P.M. D.C. motor which includes a magnetically permeable base having a central axis and a predetermined number of stator pole components, each having a field winding insulated from and surrounding a magnetically permeable core are mounted in upstanding fashion from the base to extend along a lengthwise extent to an end location. The core components are in magnetic flux transfer communication with the base and the pole components are arranged about the axis in a manner wherein the end locations thereof define a circular locus of stator pole positions. A rotor is provided which is rotatable about the aforesaid central axis and which has a magnetically permeable mount, a select number of thin permanent magnet segments formed of a magnetic material substantially resistant to demagnetization in the presence of flux directed thereinto providing discrete outwardly diposed surfaces of predetermined field polarity. The permanent magnet segments are movable along the circular locus of stator pole positions and the surfaces of the magnets are disposed perpendicularly to said core lengthwise extents and spaced from the end locations of the stator poles to define a gap which is perpendicular to the central axis.

Other objects of the invention will, in part, be obvious and will, in part, appear hereinafter.

The invention, accordingly, comprises the apparatus possessing the construction, combination of elements, and arrangements of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a sectional schematic representation of a conventional d.c. motor having three rotor poles and two stator poles;

FIG. 2 is a diagram showing a delta form of field winding circuit for motors as represented in FIG. 1;

FIG. 3 is a diagram showing a Y form of field winding circuit for motors as represented in FIG. 1;

FIG. 4 is a diagram of a circuit employed with field windings for brushless d.c. motors;

FIG. 5 is a perspective view of one embodiment of the d.c. motor according to the invention;

FIG. 6 is a partial multi-sectional view of the d.c. motor of FIG. 5 taken through planes identified as 6—6 in that figure;

FIG. 7 is a sectional view taken through the plane 7—7 of FIG. 6;

FIG. 8 is a perspective view of a stator component employed with the d.c. motor of the instant invention;

FIG. 9 is a sectional view of the d.c. motor of the invention taken through the plane 9—9 of FIG. 6;

FIG. 10 is a diagrammatic representation of stator components employed with a motor of the invention showing the skewing thereof;

FIG. 16 is a development diagram and torque contribution chart associated with a d.c. motor structured in accordance with architecture shown in FIGS. 14 and 15.

DETAILED DESCRIPTION

Figure 13:
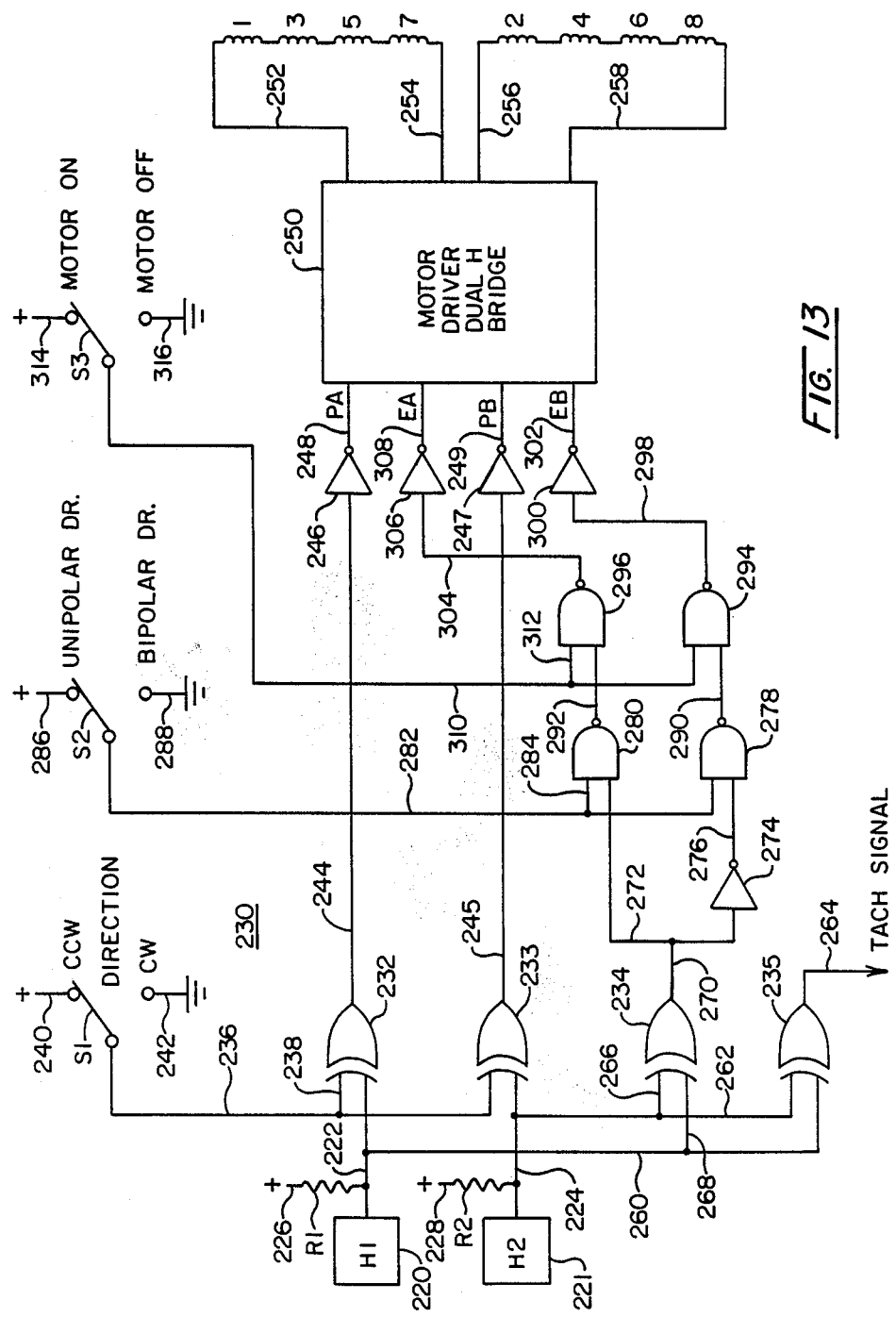
FIG. 13 is a schematic electrical diagram of a gate array form of drive circuit for the motor of FIGS. 6-9.

As a prelude to considering the instant invention in detail, the instant discourse initially looks to the general structuring of a standard P.M. D.C. motor. Referring to FIG. 1, a stylized sectional view of such a d.c. motor is represented generally at 10. The motor 10 is shown having a stator structure 12 having a cylindrical outer casing or shell 14 which supports arcuately formed ferrite-type permanent magnets shown diametrically oppositely spaced at 16 and 18. Rotationally mounted along the central axis of the motor 10 is a rotor 20, the rotor bars or poles of which at 22-24 are mounted upon a rotational axle 26. The poles 22-24 usually are formed as a lamination of steel sheets which facilitates magnetic flux transfer in consequence of their multiple surfaces. Each of the poles 22-24 is formed having an arcuate or flared outer tip as represented, respectively, at 28-30. Tips 28-30 are structured such that their outward ends are closely proximate each other to permit flux transfer thereacross. As represented at 32 and 34, each rotor pole rotates in proximity with the inwardly disposed surfaces of permanent magnets 16 and 18 to define an air gap which conventionally is referred to as a "radial gap". The gap is parallel with axle 26 or the axis of motor 10. The final principal feature of the motor 10 is comprised of the field windings which are shown at 36-38 wound in conventional form about the respective poles 22-24 internally of their outer tip portions 28-30. By selectively exciting these field windings, for example, through a commutator with brushes, a field is caused to move about the tips 28-30 as thr rotor rotates and interact with the magnetic field of permanent magnets 16 and 18 to develop motion. As is apparent, a detent torque will be developed between the tips 28-30 of the rotor 20 and the permanent magnet poles 16 and 18.

The field windings of motors as at 10 are provided either in a delta or Y configuration, the latter sometimes being referred to as a "star" winding. Looking to FIG. 2, a representation of a delta winding is provided showing pole windings 36-38 in delta form in association with their respective pole tips 28-30. For excitation of the delta coupling form from a commutator, current is caused to flow, for example, at point 40 by application of a plus polarity voltage at such point and ground or negative at point 42. Thus, current will flow through winding 37 and a current of half the value of that flowing through winding 37 will pass through windings 38 and 36 to point 42. The latter half value current occurs inasmuch as the two windings 38 and 36 are in series electrical connection.

Looking to FIG. 3, a Y type winding structure for windings 36-38 and associated respective pole tips 28-30 is revealed. Assuming current flow by application of positive input to point 44 and ground or negative at point 46, a current will be caused to flow through winding 36 and thence through winding 38. No current flows through coil 37 because of its open circuit condition. Thus, in a Y form of structuring, power is on two of the windings but not on the third, however, the same amount of current occurs in each of the powered windings as at 36 and 38 to derive the same drive forces, a performance considered more efficient.

In structuring of brushless d.c. motors, i.e. motors with no mechanical switching for commutation, the general practice is to position the field windings in stationary form within the stator of the motor, while mounting the permanent magnet components for rotation on the rotor. Referring to FIG. 4, a delta form of field winding configuration employed with a brushless d.c. motor is revealed generally at 48. The configuration 48 includes field windings 50-52 which are joined to from a delta formation at connector points 54-56. The drive circuit for the configuration 48 is shown to be comprised of NPN-PNP transistors Q1-Q2 coupled at point 54, NPN-PNP transistors Q3 and Q4 at point 55 and NPN-PNP transistors Q5-Q6 coupled at point 56. By appropriately positioned and controlled sensing devices, for example operating under the Hall effect, these transistor pairs can be appropriately switched to excite the field windings 50-52. For example, assuming that point 54 has been made positive or excited to derive a positive state, point 55 negative, and point 56 positive, then current will flow in windings 51 and 52 but not in winding 50. Thus, full current resides in two windings, 51 and 52 of full value in a fashion similar to a Y structure for a brush commutated motor.

Now looking to FIG. 5, a brushless d.c. motor formed in accordance with the teachings of the instant invention is revealed in perspective at 60. Shown in the figure is a cylindrical stator housing 62 above which is positioned a flat, relatively thin rotor 64 from which extends a drive shaft 66.

Looking additionally to FIG. 6, a sectional view additionally reveals that the stator housing 62 is formed having a support structure incorporating a centrally disposed cylindrical portion having a wall 68 supporting two spaced ball bearing type shaft supports as at 70 and 72. Journalled within the inner race of these bearings 70 and 72 is the necked down portion of shaft 66 shown at 74. A cylindrical spacer 76 is positioned intermediate bearings 70 and 72 and the lower disposed portion of bearing 72 is shown retained in position by a ring shaped sleeve 78 to complete the lower assembly. A spacer form of bushing at 82 upon which the output shaft 66 rides functions to appropriately space the rotor 64 lower surface 84 from the stator structure housing 62. Positioned between the inner cylindrical wall 68 and the outer cylindrical wall 86 of the housing 62 are eight upstanding stator poles 90-97. These stator pole pieces or components 90-97 are identically structured and, looking additionally to FIG. 8, each stator component is formed of an assemblage of rectangularly shaped stator core components 100 formed as a laminate of, for example, three magnetically permeable (steel) pole pieces 102-104. In the interest of clarity, these individual rectangular pole pieces 102-104 are shown at stator pole component 90 in FIG. 7. The stator core components 100 are retained together as a laminate by slidable insertion within the internally disposed channel of an electrically insulative bobbin 106 having integrally formed flared ends 108 and 109 (FIG. 8). The bobbins 106 are formed of a suitable plastic and have an externally disposed winding support surface which is wound with a field winding revealed at 112 in FIG. 8. Each of the stator pole pieces 90–97 is mounted within a magnetically permeable base represented generally at 114. as revealed in FIG. 6, the base 114 is configured from four stacked steel disks 116–119 which form a laminate and within which are formed a sequence of rectangular slots within which the extended mounting region of the stator core components 100 are inserted and from which such core components as well as the entire stator pole structure 90–97 is supported. The ring-shaped base disks 116–119 are retained in the position shown by a corresponding ring-shaped housing base shown in FIG. 6 at 122. FIG. 7 reveals further support and alignment of each of the stator pole components 90–97 by virture of shallow rounded elongate slots 124 and 126 formed within the respective inner surface of wall 86 and the outer surface of wall 68 of housing 62. Certain of these slots are revealed in FIG. 7 and it may be observed that the outer flared portions 108 and 109 of the bobbins 106 (FIG. 8) slide within these slots 122 and 124 during mounting procedures.

FIG. 6 reveals that the stator core components 100 extend upwardly through the top surface of stator housing 62 such that their tips represented in the figure at 128 are spaced across an interactive gap from thin permanent magnets 130 and 131 of a grouping thereof mounted within a magnetically permeable disk shaped mount or part 136 of rotor 64. Looking additionally to FIG. 9, these permanent magnet segments are seen to include additional magnets 132 and 133 which are spaced by the non-magnetic sections of the rotor 64 at 138–141 from magnets 130 and 131. The thin magnets 130–133 will have a thickness, for example, of 0.060 inch for a typical application and are formed of a magnetic material which is substantially resistant to demagnetization in the presence of flux directed into them in a direct, demagnetizing direction. For example, magnets having such high resistance to demagnetization include those formed of samarium, cobalt, neodinium, iron, or boron containing magnets, and others in the rare earth family. This magnetic material selection is made because of the unusual flux interaction developed by the architecture of the instant d.c. motor. FIG. 9 further reveals that the arcuate extent of magnets 132 and 133 is greater than that of magnets 130 and 131.

Looking to FIG. 6 it may be observed that the gaps between tips 128 and the rotor magnets 130–133 is one which is not "radial" as in typical d.c. motors. In the instant motor, the gap is perpendicular to the axis of the motor. Thus, instead of flux flowing from rotor tip to rotor tip as described above in conjunction with FIGS. 1–3, the flux from the stator pole components 90–97 is applied somewhat directly into the faces of magnets 130–133. The excitation of the field windings will be seen to be designed such that the flux generated from an excited initial stator pole component flows through an associated magnet within rotor 64 then through the magnetically permeable mount or support 136 and down into a selected second stator pole component which may or may not reside in adjacency with the initial pole.

The selection of the number of self-supporting stator pole components 90–97 as well as their orientation upon the base or base block 114 and the number and extent of permanent magnets of the rotor are selected for the characteristic torque desired in the operation of the motor of the invention. FIG. 7 futher reveals that the stator pole components are configured in somewhat nested fashion in that they are skewed from being aligned along their lengthwise extents in a radial sense from the center of the motor. In the latter regard, it may be observed that the stator core components 100 and the overall shape of the stator pole components 90–97 is one having a directional sense, the rectangular shape shown, having an extended lengthwise extent, being preferred. As is apparent, there is a broad versatility in designing the motor 10 for a given function. Each of the stator pole components, in effect, represents a design module which is supported from a stator core component 100 as it is inserted within the base block 114 slot.

Looking additionally to FIG. 10, aspects of this design approach as they concern the orientation of the stator pole components as at 90–97 are considered. In FIG. 10, a circle 150 is provided to represent the outer periphery of a given motor 10, the axis of which is represented at 152 as the center of the circle. For demonstrative purposes, a stator pole component is shown at 154 having a principal dimension or directional sense which is radially aligned through the center of the component as represented by the radius 156 drawn through the center 152 of circle 150. In similar fashion, a stator component is shown at 158 similarly aligned with a radius 160. To provide an arrangement of eight stator pole components, radius 160 will be displaced 45° from radius 156. Similarly, a third component 162 is shown aligned along radius 164. If the components 154, 158, and 162 were to be aligned as shown wherein their principal dimension or directional sense is radially aligned, then the stator structure would exhibit spaced apart concentrated areas of steel which would develop a more pronounced undesirable detent torque characteristic. To minimize this effect, the pole components are turned about their axes such that component 154 assumes, for example, an orientation as shown in phantom at 166. Similarly, component 158 can be rotated about its center such that it assumes the orientation shown in phantom at 168. It may be observed that the amount of steel or the lengthwise extent of the stator pole arrangement as observed from the center 152 encompasses a greater angular extent represented at $\theta 1$ and $\theta 2$. By not so orienting the pole components, the lesser angle $\theta 3$ is developed as shown in conjunction with pole component 162. Thus by so skewing the pole components as shown, the period of the detent torque otherwise developed will not have changed, but the amplitude of the detent torque is reduced considerably. Further, the center of magnetic influence has a tendency to move outwardly from the mechanical center of the motor structure. Generally, in the design of the motor 10, it is desired to maintain the inductance of the motor low such that low electrical time constant is achieved. This permits faster switching of the field windings of the stator. However, some drive developing flux density is surrendered. Recall with the instant approach, that there is a direct flux transfer in opposition to the permanent magnet field which would otherwise tend to demagnetize them. In effect, there is a different field interaction to achieve motor motion which might be considered a "B cross B" approach.

The field flow, for example, is one extending outwardly from pole component 154 and through an adjacent permanent magnet, having a mu of 1, thence through the permeable rotor support 136 to an oppositely excited stator pole component, for example at 162. Accordingly the fields developed create a repelling force at one rotor position while becoming attracting at another position, thus achieving rotor movement.

Where high volume production is contemplated for a given design of the motor of the instant invention, then efficiencies may be achieved by providing castings of the permeable magnetic base of the motor with integrally formed stator core components as described at 100 in FIG. 8. Powder metallurgy techniques may be used for such castings. With the arrangement, the bobbin structure 106 having been previously wound with a field winding 112 is simply inserted over the upstanding integrally case core component 100.

Figure 11:
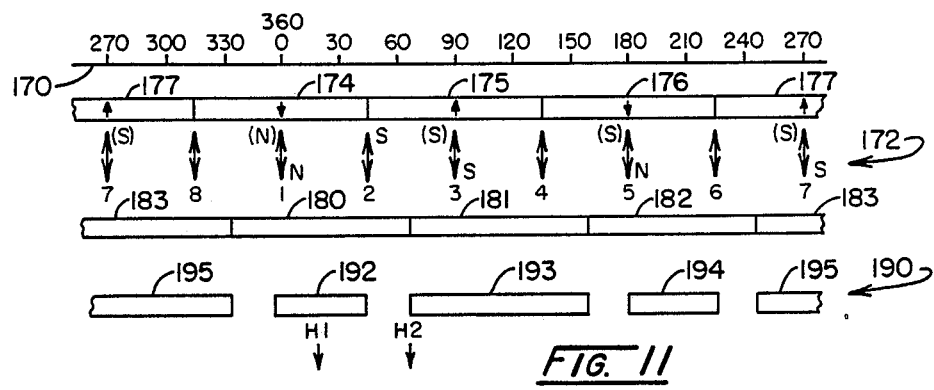
FIG. 11 is a development diagram of the d.c. motor of FIGS. 6-9.

Looking to FIG. 11, the motor 10, as representing an eight pole embodiment, may be considered and analyzed from a developed or linear aspect. In this regard, consider an axis of movement as represented by line 170. Line 170 may be arbitrarily divided into 30° segments of a total circumferential extent of 360°. Beneath these subdivisions of degrees at line 170, the positions of each stator pole may be located as represented by an array 172 of arrows, each arrow being assigned a designated numbered pole from 1 through 8. Note that poles 7 and 8 are repeated on the left of the drawing to clarify the analysis at hand and, further, the assignment of 30° divisions is expanded to the left at line 170 in correpsondence therewith. Now, the location of the peranent magnets may be assigned. For purposes of illustration, four permanent magnet poles having full 90° orientations on the rotor of the motor may be provided as represented by blocks 174-177. By so assigning the extent of the permanent magnets of the rotor, each one of the permanent magnet poles will be symmetrically disposed over either one or a pair of the stator pole components of array 172. These two positions will represent the relative orientations achieving least reluctance between the rotor and stator and highest flux density, i.e. they represent static detent positions or positions of zero static torque. In this regard, the orientation represented by blocks 174-177 is one wherein one stator pole or component is centered with respect to the extent of any given rotor magnet. The other available static detent orientation is represented by the magnets now numbered 180-183. In the latter arrangement, two stator pole components are symmetrically disposed with respect to each permanent magnet.

Figure 12:
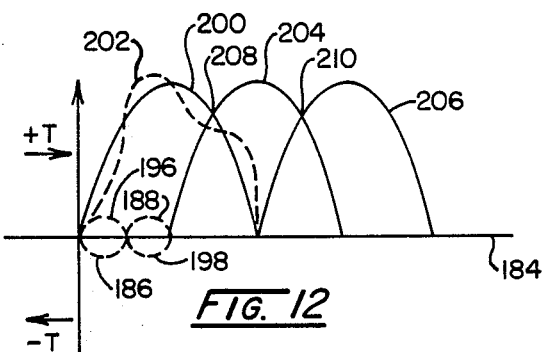
FIG. 12 is a torque curve diagram associated with the motor of FIGS. 6-9 and development diagram of FIG. 11.

Looking additionally to FIG. 12, a torque graph aligned with the pole array 172 of FIG. 11 is provided wherein, on somewhat exaggerated scale, torque, +T, meaning a torque in the direction to the right in the sense of FIG. 11 is plotted in conjunction with a corresponding negative valuation of torque, −T, or a torque urging the rotor to move to the left. Employing FIG. 12, a detent torque curve may be developed. In this regard, the influence of magnet 174 may be considered as the rotor is moved to the right in the sense of the drawing. As that movement commences to occur, the torque experienced will be one of retardation, the rotor being drawn to the left or in the negative torque sense so as to retain the detent rest status. Accordingly, for an interval representing 22½° as shown at curve 186, the static curve will be negative representing retardation. However, at that position where curve 186 crosses the rotational position axis 184, an accelerating influence will be observed which is represented as a positive torque or torque to the right in the sense of the figure. Accordingly, torque will be developed as represented at curve portion 188 for an ensuing 22½°. Without correction, such a detent torque characteristic will severely distort the energized output torque characteristic curve of the motor under consideration. To significantly alleviate the impact of such detent torque characteristics, the rotor magnet 174-177 structure may be organized such that one-half of the magnets thereon are arranged so that their detent orientation is directly in line with a given pole, while the other one-half of the magnets on the rotor are oriented so that their stator orientation, for detent torque purposes, is one aligned between the stator poles as in magnets 180-183. Returning to FIG. 11, the result may be plotted with respect to development line 170 such that a permanent magnet array 190 is developed incorporating permanent magnets 192-195. Array 190 thus represents a shortening of components within magnet grouping 180-183. The shortened magnets 192 and 194 now generate curve components 196 and 198 in FIG. 12 which are seen to effect a substantial cancellation of detent torque curves 186 and 188. This arrangement has been observed to reduce the effect of the static detent torque by a factor of 5 or 6 with respect to rotor magnet segments of equal proportions. It may be observed that the rotor arrangement 130-133 of FIG. 9 corresponds with the array development 190 of FIG. 11.

Now, considering an energization situation with respect to the developed magnet architecture of FIG. 11, assume that stator component or pole 1 is energized in a north (N) magnetic sense, then stator pole 3 would be energized in a south (S) sense while pole 5 would be energized in a north (N) sense and pole 7 in a south (S) sense. By so energizing the system a force is created on any permanent magnet in line with pole 1 which will require a satisfaction of lining up, for example with pole 3. This can only occur after a rotor movement amounting to the equivalent of 90°. Looking again to FIG. 12, this drive effect will create a torque in a positive sense represented by curve 200 which has a peak value at the 45° location. Notice that the period for the energizing torque is 180°, whereas the corresponding period for the static or detent torque is 45°. If the latter static detent torque represented by curve segments 186 and 188 were permitted to remain, then a dramatic distortion of the curve 200 will be seen, as represented by the dashed summation curve 202. However, assuming an ideal case, the energized output of the motor under consideration, when the stator windings are appropriately energized, will develop a sequence of positive torque output curves including earlier-described curve 200 and subsequent output curves 204 and 206, etc. With the arrangement shown, curve 200, is developed by the energization of stator pole components 1, 3, 5, 7. Correspondingly, to maintain a positive torque sense, curve 204 is developed with the energization of stator poles 2, 4, 6, 8. The switching system then repeats the energization of stator pole components 1, 3, 5, 7 in an opposite polar sense to generate curve 206. Generally, the motor is commutated with Hall effect sensing devices which are positioned to carry out commutation at the intersection of curves 200 and 204, i.e. at point 208 or point 210. Thus, for the switching at hand, sensing would occur at sensor positions H1 and H2, as shown by the labelled arrows in FIG. 11 and also shown positioned in FIG. 7. This is suited for a two-phase operation with unipolar drive. These sensors H1 and H2 may be combined with a relatively simple solid-state binary gate array to carry out appropriate switching in conjunction with Boolean logic as follows:

| H1 | H2 |
|----|----|
| 1  | 0  |
| 0  | 0  |
| 0  | 1  |
| 1  | 1  |
| 1  | 0  |

It is interesting to observe that by altering the control switching of the instant motor a variety of drive functions can be developed. For example, curve 200 can be generated to the extent where it again reaches an intersection with position axis 184. Under these circumstances, performance will be that of a step motor.

Looking to FIG. 13, a control circuit which may be employed with the motor of FIGS. 6 and 9 is schematically portrayed. The circuit is basically a series of logic gates which perform in conjunction with the earlier-described Hall effect devices H1 and H2 which function to sense rotor position. The gate array then functions to actuate a motor drive circuit of conventional variety. In the Figure, Hall effect sensing devices H1 and H2 which have been described in terms of position in FIG. 11 and shown in FIG. 7 are respectively represented by blocks 220 and 221. Provided, for example as Sprague type UGN3030 digital type Hall effect sensors, the output of Device 220 is provided at line 222, while the output of device 221 is represented at line 224. Line 222 is coupled through line 226 and pull-up resistor R1 to plus power supply, while correspondingly, line 224 is coupled via line 228 and pull-up resistor R2 to that same plus supply. Accordingly, the output of the sensors 220 and 221 at respective lines 222 and 224 is either a logic 1 state as the plus voltage supply, while a corresponding zero state will be presented as about a zero voltage value. Thus influenced by the opposite polarities of the magnetic field of the magnets of the rotor, for the instant demonstration, when a north pole is influencing the Hall effect device a "1" logic output is developed, while a south polar influence will be represented as a "zero" logic state. It may be noted that this logic can be reversed by simply turning the devices upside down in their mounting. The Hall effect devices 220 and 221 are mounted apart by an amount of 45° of rotation of the rotor of the motor design incorporating eight poles and four rotor magnets. Thus, a two phase form of the motor architecture is developed and as the rotor is rotated, the pattern of logic represented by the above-noted tabulation occurs.

The figure shows that the outputs at lines 222 and 224 are directed to an array 230 of exclusive OR gates shown at 232-235. Gates 232-235, in conventional fashion, provide a zero output when the inputs thereto are logic 0, 0 as well as when the inputs are a logic 1, 1. Output line 222 is shown directed to one input of gate 232, while corresponding Hall effect device output line 224 is shown directed to one input of gate 233. The opposite input to these gates 232 and 233 emanates from a directional control switch S1 through lines 236 and 238. Thus, when switch S1 is coupled to plus supply through line 240 the motor will be driven in a counter-clockwise direction, while when the switch is thrown to its terminal at line 242 the motor will be driven in a clockwise direction.

The outputs of gates 232 and 233 are provided respectively at lines 244 and 245 which are directed through respective inverters 246 and 247. The outputs of inverters 246 and 247 are provided respectively at lines 248 and 240 which are coupled with the respective $P_A$ and $P_B$ input terminals of a dual, H-bridge motor driver 250. Driver 250 may be provided, for example, as a type UDN-2993B Dual H-bridge Motor Driver by Sprague Electric Company of Worcester, Massachusetts. Each of the included full-bridge drivers has separate input level shifting, internal logic, source and synch drivers in an H-bridge configuration, and internal clamp diodes. Additionally, a phase input to each bridge determines load-current direction.

The output of device 250 is shown providing for simultaneous energization of field windings 1, 3, 5, and 7 as described in conjunction with FIG. 11 via lines 252 and 254. Similarly, the ouput provides for the simultaneous excitation of corresponding field windings 2, 4, 6, and 8 through lines 256 and 258.

Returning to gate array 230, it may be observed that the outputs of Hall effect devices 220 and 221 additionally are directed via respective lines 260 and 262 to the inputs of gate 235. Gate 235 then functions to develop a tachometer form of signal at its output at line 264. This signal may be employed, for example, to determine motor speed or for use in conjunction with speed regulation circuits.

Line 262 is coupled through line 266 to the one input of gate 234 of array 230, while the other input to the gate is derived from line 260 via line 268. Thus, the two outputs of Hall effect devices 220 and 221 are summed at the input of gate 234 and this information is used with other gate logic to supply the motor driver circuit 250 with requisite signals for developing unipolar drive or bipolar drive operation. In this regard, under unipolar drive, one-half of the field windings, i.e. as at 1, 3, 5, and 7 are driven and, subsequently, field windings 2, 4, 6, and 8 then are driven. The sequence then reverts back to effecting excitation of poles 1, 3, 5, and 7 in an opposite polar sense and subsequently the same form of drive is applied to windings 2, 4, 6 and 8, whereupon the sequence repeats itself. Under bipolar drive, all field windings 1-8 are driven simultaneously in a predetermined sequence of polar designations. The development of these bipolar or unipolar drive attributes is achieved by appropriate signal inputs to the enable terminals, $E_A$ and $E_B$ of the motor driver circuit 250. The logic to these inputs is developed from gate 234 of array 230. Looking to that gate it may be observed that the output thereof at line 270 is directed to a line 272 which inverts the output signal at inverter 274 for presentation via line 276 to one input of NAND gate 278. The opposite, non-inverted output of gate 234 is directed to one input of corresponding NAND gate 280. The opposite inputs to gates 278 and 280 is derived via respective lines 282 and 284 which carry either +v or ground in consequence of the orientation of a switch S2. The latter switch, when connected to +v supply via line 286 provides for unipolar drive logic, while when coupled via line 288 to ground, provides for bipolar drive logic. The logic outputs of gates 278 and 280 are shown at respective lines 290 and 292 being directed to one input of respective NAND gates 294 and 296. The output of gate 294 at line 298 is directed through inverter 300 and line 302 to the $E_B$ enable gate for phase B of driver 250, while the corresponding output of NAND gate 296 at line 304 is directed through inverter 306 and line 308 to the enable terminal, $E_A$ for phase A of the motor driver 250.

To turn the motor on and off, the opposite inputs to NAND gates 294 and 296 is coupled via lines 310 and 312 to the output terminal of switch S3. With the arrangement shown, the motor is turned on when switch S3 is coupled with +v through line 314 and is turned off when the switch S3 couples line 310 to ground via line 316. Generally, to shut the motor off, the two enable inputs, $E_A$ and $E_B$ are held at zero logic level while turning the motor on, provides for their selectively receiving a logic high signal.

The gate array 230 including the NAND and inverter logic shown in the figure are arranged such that a brushless type motor drive function may be carried out for use in computer devices and the like. By altering this gate input logic, the motor of the invention can be caused to assume any of a variety of operational modes of performance depending upon the needs of a particular user. Thus, the univeral form of motor structure is achieved which may be varied by appropriate selection of input logic. For example, if it were desired to operate the motor of the invention as a step motor, then the Hall devices would not be employed but an inputting clock signal would be used in their place in conjunction with a reconfigured array of logic gating. Further, both a Hall device input and a clock input may be used together wherein the Hall effect devices are employed to develop position data in conjunction with the clock input to evolve a closed loop form of performance. Another application of the gate array may, for example, provide for operation over a limited angle of rotation as a torque device. For all of these applications, the logic is developed on a gate array chip customized to the user's desires, for example, by a mask change at the semiconductor level.

The motor architecture of the invention can be altered to different combinations of numbers of stator pole components and rotor permanent magnet components as part of its unique modularity. In this regard, reference is made to FIG. 14 where a stator structure 318 is shown having a permeable base 320 structured similarly to base 114 which supports and is in magnetic communication with 14 stator pole components 321-334. Each of these components may be structured identically to that discussed in FIG. 8. A rotor mounting shaft is shown at 336 extending through an appropriate support structure including bushings, bearings and the like, as discussed in conjunction with FIG. 6. This shaft 336 extends to a rotor structure similar to that discussed in connection with FIG. 6 and represented at 340 in FIG. 15. Note that the rotor 340 includes six permanent magnet sectors 341-346 which are of the same arcuate extent with respect to their relative instantaneous positioning before the stator components 320-334. As before, these magnets are thin and are selected having a significant resistance to demagnetization occasioned by a direct interaction of an opposing field, as is developed with the stator components 321-334.

Figure 14:
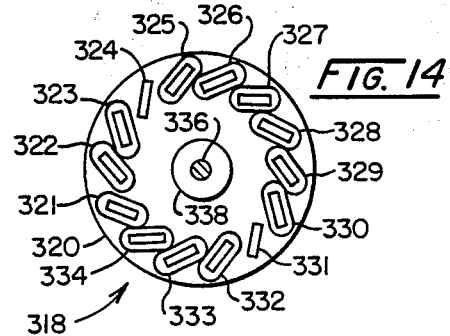
FIG. 14 is a top view of the stator components assembled in a motor according to the invention having 14 stator pole component positions.
Figure 15:
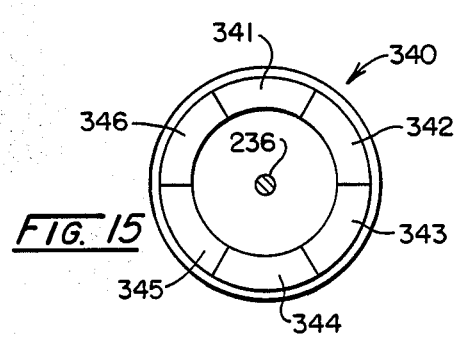
FIG. 15 is a sectional view of a rotor taken in the sense of that of FIG. 9 showing rotor pole component locations employed with the stator component locations of the motor of FIG. 14.

Looking to FIG. 16, a development of a 14 stator pole, six permanent magnet rotor pole motor assemblage, as discussed in connection with FIGS. 14 and 15 is set forth in similar fashion as FIG. 11. Accordingly, the rotational locus of the permanent magnets is identified in terms of degrees from 0° through 360° and the permanent magnets 341-346 are shown having a rotational influence representing 60° of rotation per magnet. Essentially no variation in this locus of association between the stator components and the magnets is provided. In the interest of clarity, the stator pole component array described at 321-334 in FIG. 14 is represented by arrows which are numbered 1 through 14 in conjunction with the above-noted general designation. Stator position 1 in the development is arbitrarily positioned at the center of magnet 341 or at a 30° position. By so positioning the magnet at this location and assuming equal orientations of the stator components 321-334, then the stator centers of influence will be mutually separated by an amount of 25.7°. This results in stator component number 8 being at the center of permanent rotor magnet 344 as shown in the drawings. To study an energization drive scheme for the stator components, certain arbitrary initial assumptions are made. In this regard, it is assumed that a maximum torque contribution between the rotor and a given stator pole occurs when that stator pole in its energized state is located closely adjacent the north-south (N-S) union between two adjacent rotor magnets. In the assumption to follow, where this positioning occurs, then the stator position is assumed to be contributing 100% of available torque. A positive direction is assumed, for the instant demonstration, to be in a direction from left-to-right in the sense of FIG. 16. Thus, where the rotor has moved such that the stator pole is displace 10° away from the center of an associated rotor magnet, then it is assumed to be contributing 40% of otherwise maximum available torque either in a positive or negative direction depending upon excitation. Where the stator pole is positioned 20° away from the center of an associated rotor magnet, then it is closer to the union of that magnet with the next succeeding permanent magnet and its developed torque is arbitrarily assigned a 70% available contribution. Finally, where the rotor magnet has been so positioned that the stator pole is 30° away from the center of the magnet, then it is essentially adjacent to the union of that magnet with the next rotor magnet and it is assigned a 100% contribution to available torque. The relative contributions for a given movement of the rotor 340 then can be charted. Accordingly, these contributions are established for rotation of the rotor 340 in 10° increments under the offset amount column labelled "O.S." in the figure. Because of the flexibility inherent in electronic control over the excitation of the stator field windings at components 321-334, selections of which windings are to be energized and the polar sense of such energization can be assigned on a basis tending to maximize torque or any other parameter desired by the designer. For the instant illustration, north-south polar assignments (N,S) are provided for each of the windings of the stator components represented in the figure as 1-14. Beneath each of the stator winding positions, there is assessed a contribution of torque on the above percentage basis along with the direction which that torque may take. For example, at 0°, there is no torque developed at stator component locations 1 or 8. However, as the rotor is moved from left to right 10° (in the sense of FIG. 16), then the contribution at the first stator component position 1 becomes 40% as it does at pole 8. Note that the values for the positions pole 8 through pole 14 repeat those given for positions 1 through 7. However, the assignment of polar sense to the excitation of the stator windings for component locations 8 through 14 are reversed with respect to the position 1 through 7. When operating this motor as a torque motor with limited rotation, all the poles that are a positive contributing factor or force may be summed. These contributing percentages then can be summed as set forth in the vertical column labelled "Cont.Sum". However, in arriving at these sums, it may be observed that stator pole component positions 4 and 11 are not included, inasmuch as their contributions are essentially negated by the combination positive and negative values. The shape of the combined torque curve can be modified depending on which stator poles are summed. In the application shown, twelve stator poles are summed to give a broad (flatter) top torque curve for torque motor operation. When operating this design as a continuously rotating motor, an appropriate number of stator poles may be summed to represent a "phase" of motor excitation. For instance, for three phase ($3\phi$) operation four stator pulses are summed for each phase and commutation occurs at approximately 20 degree increments.

Figure 17:
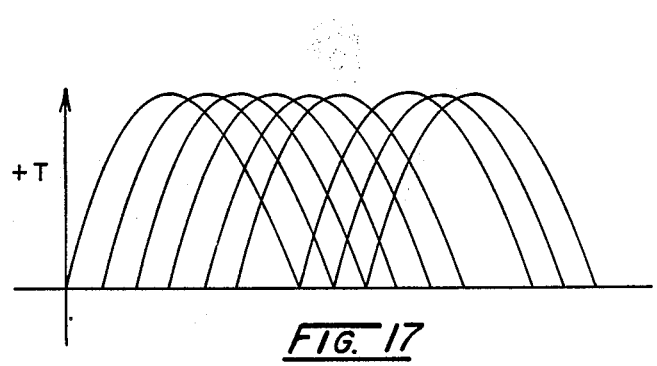
FIG. 17 is a torque output curve corresponding with the development diagram of FIG. 16.

When the assignment of excitation locations is appropriately set forth, then each stator pole contribution may be plotted as represented in FIG. 17 which has been developed in identical manner as the plot represented at FIG. 12 with respect to curves 200, 204, and 206. Thus, optimization of motor design may be achieved. The above analysis indicates that, while a first evaluation would show that a motor having a combination of 12 stator components in conjunction with six permanent magnet rotor components would provide maximum energized torque output, investigations as above, have found that the minimization of detent torque phenomena is improved with the addition of a thirteenth stator component and is further improved over that configuration with the provision of fourteen stator component location as described above.

From the foregoing it may be observed that the motor of the instant invention represents a unique form of drive architecture which is more fascile to produce and thus, is less expensive. The design of the motor is such that it is readily developed in a modular sense such that it may be modified or customized to suit the needs of a particular application. In this regard, the windings are readily altered and the flexibility of design is such that motors produced with the system can range from consistent torque output devices to step-type motors or torque devices of limited rotation. As is apparent from the development diagrams, the architecture can be applied to a linear form of drive device.

Since certain changes may be made in the above-described apparatus without departing from the scope of the invention herein involved, it is intended that all matter contained in the description thereof or shown in the accompanying drawings shall be interpreted as illustrative and not in a limiting sense.

What is claimed is:

1. Motion generating apparatus, comprising:
a magnetically permeable base;
a stator having a predetermined number of magnetically permeable core components supported in upstanding fashion from said base, in magnetic flux transfer communication therewith and extending along their lengthwise extents to end locations arranged to define a locus of selectively spaced pole positions;
insulative means mounted over each said core component for providing insulation over the said lengthwise extent thereof;
field winding means supported upon said insulative means and selectively excitable during an excitation state; and
rotor means including a magnetically permeable support, a select number of thin permanent magnet segments formed of a magnetic material substantially resistant to demagnetization in the presence of flux directed thereinto, supported by said support, movable along said locus to provide flat outwardly disposed surfaces extending over said pole positions and substantially perpendicular to said lengthwise extents thereof, the surface of said magnet segments being spaced a predetermined gap width from said end locations and being configured having a dimension along said locus selected to effect a substantial minimization of static state attraction and repulsion characteristics between said rotor means and said pole positions when said rotor means is driven during said excitation state by select excitation of said field winding means.

2. The motion generating apparatus of claim 1 in which:
said stator core components are mounted to define said locus which is circular and having a central axis;
said stator core components are configured having a given thickness and a principal widthwise dimension along each said end location, said core components being mounted wherein said principal widthwise dimension is skewed with respect to a radius through said axis an amount selected to minimize said static state attraction and repulsion characteristics.

3. The motion generating apparatus of claim 1 in which said rotor means has an axis of rotation coincident with said central axis, and said magnetic material is comprised of rare-earth magnets.

4. A d.c. motor comprising:
a magnetically permeable base having a central axis;
a predetermined number of stator pole components each having a field winding insulated from and surrounding a magnetically permeable core mounted in upstanding fashion from said base to extend along a lengthwise extent to an end location and being in magnetic flux transfer communication with said base, said pole components being arranged about said axis in a manner wherein said end locations thereof define a circular locus of stator pole positions; and
rotor means rotatable about said axis and having a magnetically permeable mount, a select number of thin permanent magnet segments formed of a magnetic material substantially resistant to demagnetization in the presence of flux directed thereinto providing discrete outwardly disposed surfaces of predetermined field polarity, said magnet segments being movable along said circular locus of stator pole positions and said surfaces thereof being disposed perpendicularly to said core lengthwise extents and spaced from said end locations to define a gap therebetween perpendicular to said axis.

5. The d.c. motor of claim 4 including:
sensor means supported within a housing adjacent said rotor means and responsive to said field polarity during rotation of said rotor means to provide position signals: and control means responsive to said position signals for effecting a select energization of said field windings.

6. The d.c. motor of claim 4 in which:

each said stator pole component core is configured rectangularly having a given thickness, lengthwise dimension along said lengthwise extent and a principal widthwise dimension; and each said stator pole component includes an electrically insulative bobbin having a centrally disposed channel within which said core is insertable and having a winding support surface for supporting a said field winding.

7. The d.c. motor of claim 6 in which:

said stator pole component lengthwise dimension is selected to extend outwardly of said bobbin to define a mounting region; and said base is configured having slots formed therein along said circular locus of stator pole positions for supportively receiving said mounting regions to effect said upstanding mounting.

8. The d.c. motor of claim 4 in which said magnetically permeable base and said magnetically permeable cores of said predetermined number of stator pole components are an integral, cast structure.

9. The d.c. motor of claim 4 in which:

said rotor means permanent magnet segments are comprised of rare-earth magnets; and each said stator pole component includes an electrically insulative bobbin having a centrally disposed channel within which said core is insertable and having a winding support surface for supporting said field winding.

10. The d.c. motor of claim 9 in which:

said stator pole component lengthwise extent is selected to extend outwardly of said bobbin to define a mounting region; and said base is configured having slots formed therein along said circular locus of stator pole positions for supportively receiving said mounting regions to effect said upstanding mounting.

11. The d.c. motor of claim 10 in which said magnetically permeable base and said magnetically permeable cores of said predetermined number of stator pole components are an integral, cast structure.

12. The d.c. motor of claim 4 in which said rotor means permanent magnet segments are comprised of rare-earth magnets.

13. The d.c. motor of claim 4 in which:

said predetermined number of stator pole components is fourteen; and said rotor means includes six said permanent magnet segments substantially equal dimensions along said circular locus.

14. Motion generating apparatus, comprising:

a magnetically permeable base;

a predetermined number of magnetically permeable core components supported in upstanding fashion from said base, in magnetic flux transfer communication therewith and extending along their lengthwise extents to end locations arranged to define a locus of selectively spaced pole positions;

insulative means mounted over each said core component for providing insulation over the lengthwise extent thereof;

field winding means configured about said insulative means for selective excitation;

rotor mensa including a magnetically permeable disk-shaped mount, a select number of thin permanent magnet segments fixed to said mount and having flat, outwardly disposed face sufaces and formed of a magnetic material substantially resistant to demagnetization in the presence of a flux directed thereinto, said magnet segment face surfaces being perpendicular to said lengthwise extents of said core components, spaced a predetermined gap distance from said end locations and movable along said locus, said magnet segments having dimensions along said locus to effect a substantial minimization of static state attraction and repulsion characteristics between said magnet segments and said pole positions during movement along said locus; and control means for effecting the discrete excitation of a select two of said field windings means for deriving a predetermined magnetic circuit flux flow along said base and through the said core components supporting said select two field windings.

15. The motion generating apparatus of claim 14 in which:

said control means discrete excitation derives said predetermined magnetic circuit flux flow including flux flow along said rotor means disk-shaped mount.

16. Motion generating apparatus, comprising:

a magnetically permeable base;

a predetermined number of magnetically permeable stator core components having a given thickness and principal lengthwise extent supported in upstanding fashion from said base, in magnetic flux transfer communication therewith and extending along their lengthwise extents to end locations arranged to define a circular locus of selectively spaced pole positions having a central axis;

insulative means mounted over each said core component for providing insulation over said lengthwise extent thereof;

field winding means supported upon said insulative means and selectively excitable during an excitation state;

driver means including a select number of permanent magnet segments mounted for driver movement along said locus, said magnet segments being spaced a predetermined gap width from said end locations and being configured having a dimension along said locus selected to effect a substantial minimization of static state attraction and repulsion characteristics between said driver means and said pole positions when said driver means is driven during said excitation state by select excitation of said field winding means and said stator core components being mounted wherein the principal widthwise dimension is skewed with respect to a radius through said axis an amount selected to minimize said static state attraction and repulsion characteristics.

17. The motion generating apparatus of claim 16 in which said magnetically permeable base and said predetermined number of magnetically permeable stator core components are an integral, cast structure.

18. The motion generating apparatus of claim 16 in which said driver means is a rotor having an axis of rotation coincident with said central axis, and said permanent magnet segments are comprised of rare-earth magnets.

19. The motion generating apparatus of claim 18 in which said rotor comprises a maagnetically permeable mount for supporting said rare-earth magnets.

20. The motion generating apparatus of claim 16 in which:
said predetermined number of core components is eight; and
said driver means includes four permanent magnet segments, each of the first and second ones thereof having a dimension along said locus selected to span two adjacent stator pole positions.

21. The motion generating apparatus of claim 20 in which said driver means is a rotor having an axis of rotation coincident with said central axis, and said permanent magnet segments are comprised of rare-earth magnets.

22. The motion generating apparatus of claim 16 in which:
said predetermined number of core components is fourteen; and
said driver means includes six permanent magnet segments having substantially equal dimensions along said locus spaning said fourteen core components.

23. Motion generating apparatus, comprising:
a magnetically permeable base;
eight magnetically permeable core components supported in upstanding fashion from said base, in magnetic flux transfer communication therewith and extending along their lengthwise extents to end locations arranged to define a locus of selectively spaced pole positions;
insulative means mounted over each said core component for providing insulation over the said lengthwise extent thereof;
field winding means supported upon said insulative means and selectively excitable during an excitation state; and
driver means including four permanent magnet segments mounted for driver movement along said locus, said magnet segments being spaced a predetermined gap width from said end locations and being configured having a dimension along said locus selected to effect a substantial minimization of static state attraction and repulsion characteristics between said driver means and said pole positions when said driver means is driven during said excitation state by select excitation of said field winding means, first and second ones of said segments having a dimension along said locus selected to span two adjacent said pole positions and third and fourth ones of said permanent magnet segments having dimensions along said locus selected aas about one-half the dimensions of said first and second magnetic segments.

24. A d.c. motor comprising:
a housing having a central axis;
a magnetically permeable base mounted with said housing about said axis;
eight stator pole components each having a field winding insulated from and surrounding a magnetically permeable core mounted in upstanding fashion from said base to extend to an end locations and being in magnetic flux transfer communication with said base, said pole components being arranged about said axis in a manner wherein said end locations thereof define a circular locus of stator pole positions; and
rotor means rotatable about said axis and having four permanent magnets disposed therein providing discrete surfaces of predetermined field polarity, said magnets being movable along said circular locus of stator pole positions and said surfaces thereof being spaced from said end locations to define a gap therebetween perpendicular to said axis, first and second of said permanent magnets having dimensions along said circular locus selected to span two adjacent stator pole positions, and third and fourth ones of said permanent magnets having dimensions along said circualr locus selected as about one-half the dimensions of said first and second magnets.

25. A d.c. motor comprising:
a housing having a cental axis;
a magnetically permeable base mounted with said housing about said axis;
a predetermined number of stator pole components each having a field winding insulated from and surrounding a magnetically permeable core mounted in upstanding fashion from said base to extend to an end location and being in magnetic flux transfer communication with said base, each said pole component core being configured having a principal lengthwise and widthwise dimension and mounted such that said principal widthwise dimension is skewed about its center with respect to a radius through said axis an amount selected to diminish detent torque phenomena, said pole components being arranged about said axis in a manner wherein said end locations thereof define a circular locus of stator pole positions; and
rotor means rotatable about said axis and having permanent magnets disposed therein provided discrete surfaces of predetermined field polarity, said magnetis being movable along said circular locus of stator pole positions and said surfaces thereof being spaced from said end locations to define a gap therebetween perpendicular to said axis.

26. Motion generating apparatus, comprising:
a magnetically permeable base;
a predetermined number of magnetically permeable stator core components having a given thickness and principal lengthwise extent supported in upstanding fashion from said base, in magnetic flux transfer communication therewith and extending along their lengthwise extents to end locations arranged to define a circular locus of selectively spaced pole positions having a central axis;
insulative means mounted over each said core component for providing insulation over said lengthwise extent thereof;
field winding means supported upon said insulative means and selectively excitable during an excitation state;
driver means including a select number of permanent magnet segments mounted for driver movement along said locus, said magnet segments being spaaced a predetermined gap width from said end locations and being selectively dimensioned along said locus; and
said stator core components being mounted wherein principal widthwise dimension is skewed with respect to a radius through said axis an amount selected to effect a substantial minimization of static state attraction and repulsion characteristics between said driver means and said pole positions when said driver means is driven during said excitation state by select excitation of said field winding means.

* * * * *